US006748832B1

(12) United States Patent
Maxwell

(10) Patent No.: US 6,748,832 B1
(45) Date of Patent: Jun. 15, 2004

(54) UNIVERSAL LUG WRENCH

(76) Inventor: Foy Maxwell, Box 863, Hendersonville, NC (US) 28793

( * ) Notice: Subject to any disclaimer, the term of this patent is extended or adjusted under 35 U.S.C. 154(b) by 0 days.

(21) Appl. No.: 10/086,408

(22) Filed: Mar. 1, 2002

(51) Int. Cl.[7] .............................................. B25B 23/00
(52) U.S. Cl. ....................... 81/462; 81/121.1; 81/180.1; 81/52; 81/124.1
(58) Field of Search .............................. 81/462, 121.1, 81/180.1, 52, 177.25, 177.2, 177.5, 177.1, 124.4

(56) References Cited

U.S. PATENT DOCUMENTS

| 2,447,919 | A | * | 8/1948 | Teigen .......................... 81/462 |
| 3,158,050 | A | * | 11/1964 | Shandel ........................ 173/93 |
| 4,537,101 | A | * | 8/1985 | Eversole ...................... 81/180.1 |
| 4,620,462 | A | * | 11/1986 | Parker .......................... 81/462 |
| 4,625,600 | A | * | 12/1986 | Koren et al. .................. 81/462 |
| 4,972,742 | A | * | 11/1990 | Brown .......................... 81/462 |
| 5,431,074 | A | * | 7/1995 | Durante ........................ 81/462 |
| 5,528,964 | A | * | 6/1996 | Smith, Jr. ..................... 81/180.1 |
| 5,613,411 | A | * | 3/1997 | Rines ........................... 81/462 |
| 5,967,005 | A | * | 10/1999 | DeVore et al. ................ 81/462 |
| 6,199,456 | B1 | * | 3/2001 | Hlady ......................... 81/177.2 |

* cited by examiner

*Primary Examiner*—Joseph J. Hail, III
*Assistant Examiner*—Alvin J Grant
(74) *Attorney, Agent, or Firm*—Michael I Kroll

(57) ABSTRACT

The present invention 10 discloses a universal lug wrench that can be used by ordinary people to loosen and fasten the lug nuts 12 on automobile tires 14 without undue strain on the users part. This is made possible by a supporting adjustment stand 16 and the longer arm 18 of the wrench 20. The present invention 10 is also easy to disassemble and store and also versatile as the sockets 22, 23 for the lug nuts 12 of different sizes can easily be interchanged. The purpose of the wrench 20 is to exert a torque on a lug nut 12 at the socket 22 end and around the axis by pressing the handle end 21. The improved wrench of the present invention 10 eliminates the unwanted torque generated by a conventional wrench 24. The present invention 10 has an extension 54 for the sockets 22 that are inserted into the adjustable clamp 56 and provides a pivoting point for the wrench 20. Various sockets 22, 23 can be interchangeably used for lug nuts 12 of different sizes.

4 Claims, 11 Drawing Sheets

UNIVERSAL LUG WRENCH

BACKGROUND OF THE INVENTION

Field of the Invention

The present invention relates generally to lug wrench tools and, more specifically, to a universal lug wrench that can be used by ordinary people to loosen and fasten the lug nuts on automobile tires without undue strain on the users part. This is made possible by the supporting adjustment stand and the longer arm of the wrench. The present invention is also easy to disassemble and store and also versatile as the sockets for the lug nuts of different sizes can easily be interchanged. The purpose of the wrench is to exert a torque on a lug nut at the socket end and around the axis by pressing the handle end. The improved wrench of the present invention eliminates the unwanted torque generated by the wrench. The present invention is comprised of an extension for the sockets that are inserted into the adjustable clamp and provides a pivoting point for the wrench. Various sockets can be interchangeably used for lug nuts of different sizes, making the device of the present invention a versatile tool.

While these other lug wrench tools may be suitable for the purposes for which they were designed, they would not be as suitable for the purposes of the present invention, as hereinafter described. The present invention a universal lug wrench that can be used by ordinary people to loosen and fasten the lug nuts on automobile tires without undue strain on the users part. This is made possible by the supporting adjustment stand and the longer arm of the wrench. The present invention is also easy to disassemble and store and also versatile as the sockets for the lug nuts of different sizes can easily be interchanged.

SUMMARY OF THE PRESENT INVENTION

The present discloses a universal lug wrench that can be used by ordinary people to loosen and fasten the lug nuts on automobile tires without undue strain on the users part. This is made possible by a supporting adjustment stand and the longer arm of the wrench. The present invention is also easy to disassemble and store and also versatile as the sockets for the lug nuts of different sizes can easily be interchanged. The purpose of the wrench is to exert a torque on a lug nut at the socket end and around the axis by pressing the handle end. The improved wrench of the present invention eliminates the unwanted torque generated by a conventional wrench. The present invention has an extension for the sockets that are inserted into the adjustable clamp and provides a pivoting point for the wrench. Various sockets can be interchangeably used for lug nuts of different sizes, making the device of the present invention a versatile tool.

A primary object of the present invention is to provide a universal lug wrench.

Another object of the present invention is to provide a universal lug wrench that can be used by ordinary people to loosen and fasten the lug nuts on automobile tires without undue strain on the users part.

Yet another object of the present invention is to provide a universal lug wrench that make use of the device easy by the supporting adjustment stand and the longer arm of the wrench.

Still yet another object of the present invention is to provide a universal lug wrench that is also easy to disassemble and store.

Yet another object of the present invention is to provide a universal lug wrench that is versatile as the sockets for the lug nuts of different sizes can easily be interchanged.

Still yet another object of the present invention is to provide a universal lug wrench that is comprised of an extension for the sockets that are inserted into the adjustable clamp and provides a pivoting point for the wrench. Various sockets can be interchangeably used for lug nuts of different sizes, making the device of the present invention a versatile tool.

Additional objects of the present invention will appear as the description proceeds.

The present invention overcomes the shortcomings of the prior art by providing a universal lug wrench that can be used by ordinary people to loosen and fasten the lug nuts on automobile tires without undue strain on the users part. Also, that make use of the device easy by the supporting adjustment stand and the longer arm of the wrench. Also, a universal lug wrench that is also easy to disassemble and store and is versatile as the sockets for the lug nuts of different sizes can easily be interchanged.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
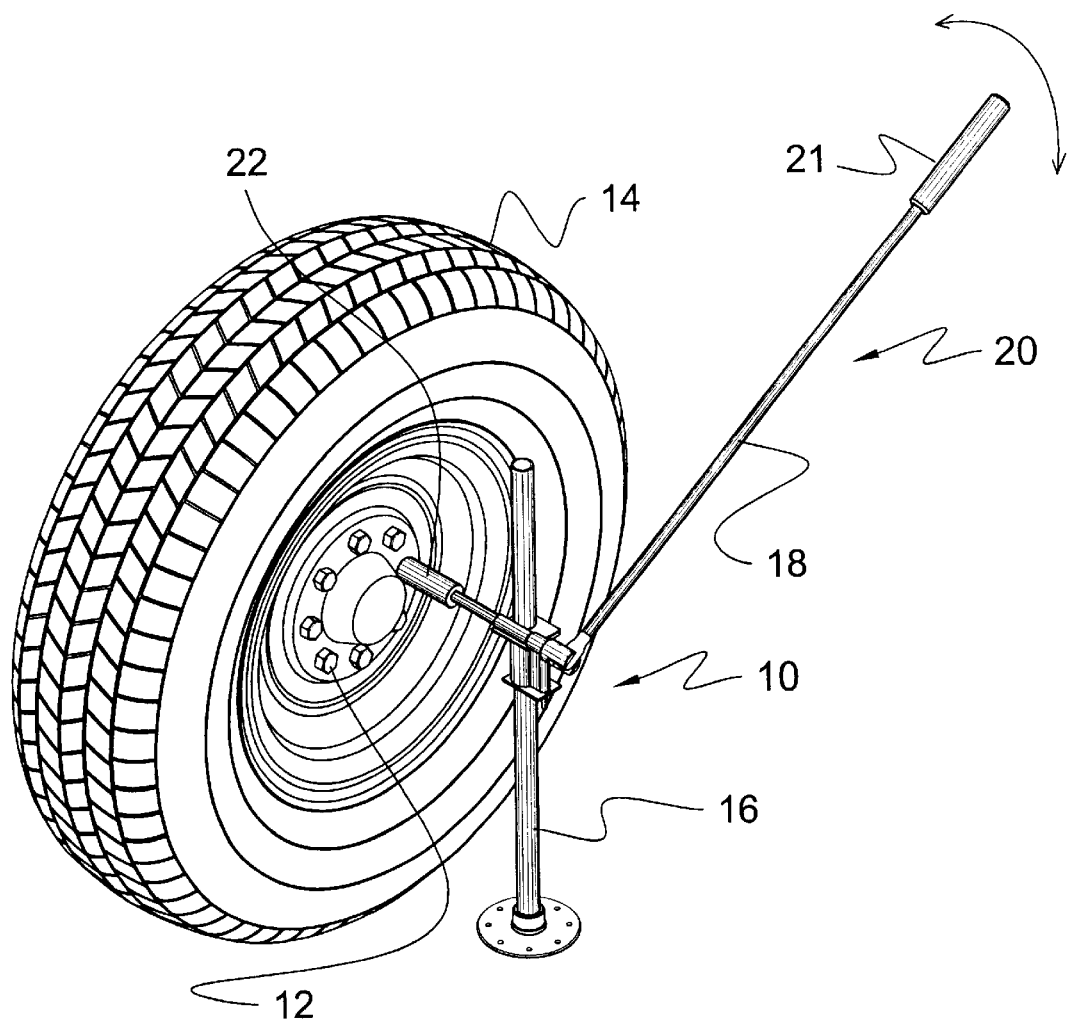
FIG. 1 is a perspective view of the present invention in use.

With regard to reference numerals used, the following numbering is used throughout the drawings.
10 present invention
12 lug nut
14 tire
16 adjustable stand 18 arm
20 wrench
21 handle
22 socket
23 extra socket
24 prior art wrench
25 elbow
26 point
28 short arm axis
30 end point
32 handle
34 length of leverage
36 length of short arm
38 axis
40 prior art wrench
42 arm end point
44 arm end point
48 axis
50 point of torque
52 length of arm
54 extension
56 clamp
57 clamp aperture
58 head
60 rod
62 release lever
64 base
66 oil hole
68 connector sleeve

DETAILED DESCRIPTION OF THE PREFERRED EMBODIMENT

The following discussion describes in detail one embodiment of the universal lug wrench. This discussion should not be construed, however, as limiting the invention to those particular embodiments since practitioners skilled in the art will recognize numerous other embodiments as well. For a definition of the complete scope of the invention the reader is directed to the appended claims.

Turning to FIG. 1, shown therein is a view showing the present invention 10 in action. The present invention 10 can be easily used by ordinary people to loosen and fasten the lug nuts 12 on automobile tires 14 without undue strain on the users part. This is made possible by the supporting adjustable stand 16 and the longer arm 18 of the wrench 20 having handle 21 thereon. The present invention 10 is also easy to disassemble and store and also versatile as the sockets 22 for the lug nuts of different sizes can easily be interchanged.

Figure 2:
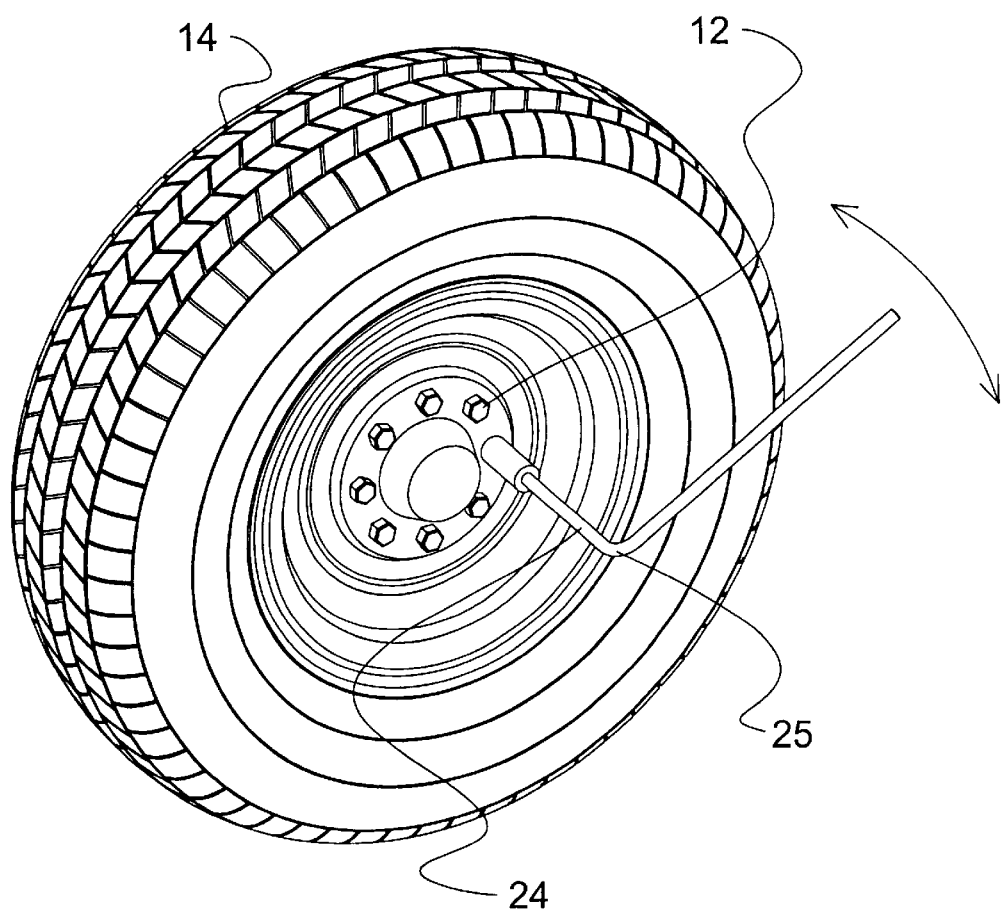
FIG. 2 is a view of a prior art wrench in use.

Turning to FIG. 2, shown therein is a view of a prior art wrench 24 in use. Shown is one of the conventional wrenches 24 found in many automobiles. This type of wrench 24 is hard to use due to the limited size and because the user is unable to use two hands to apply a force because one hand is used to support the wrench at elbow 25 during use. Also shown are the lug nut 12 and tire 14.

Figure 3:
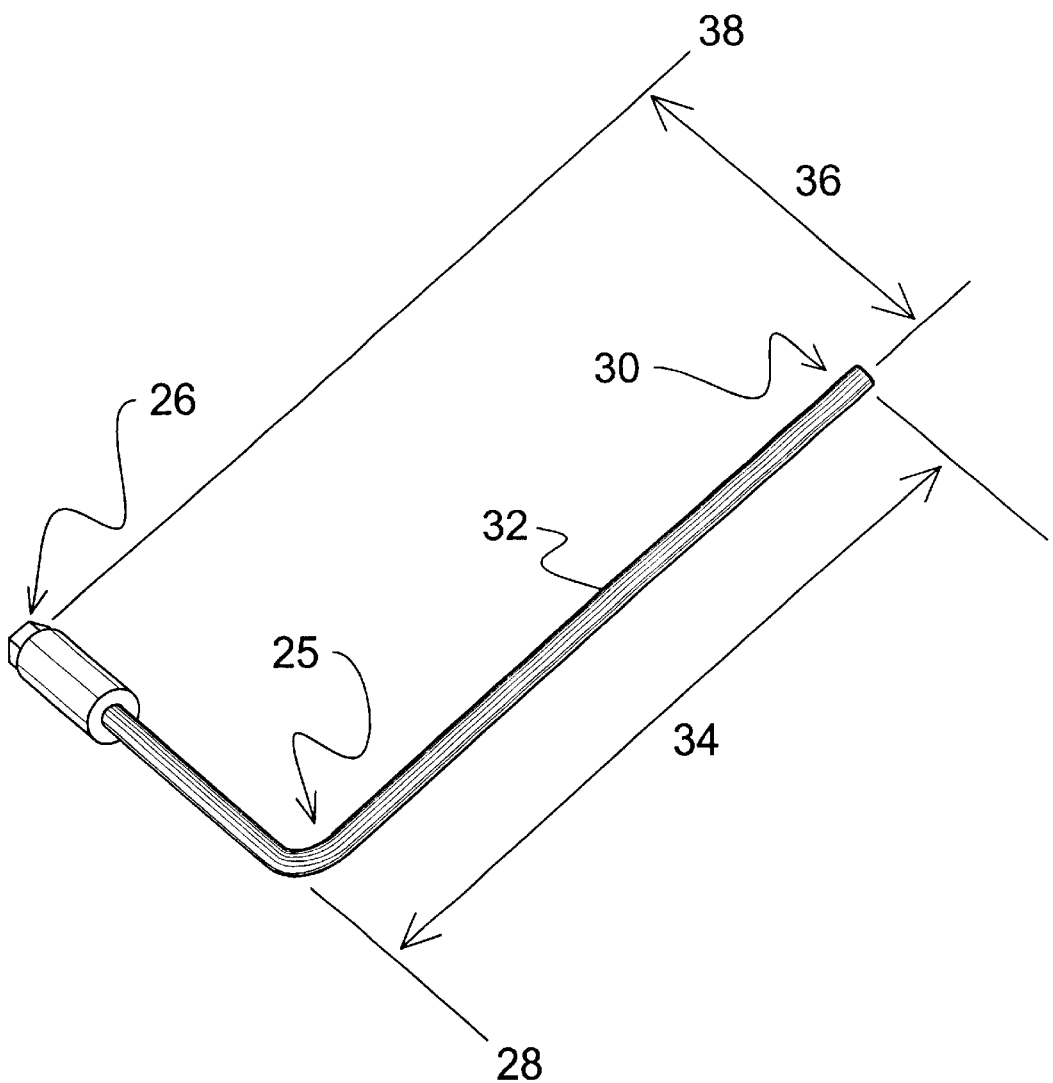
FIG. 3 is a diagram of the torques acting on the wrench shown in FIG. 2.

Turning to FIG. 3, shown therein is a diagram of the torques acting on the conventional wrench 24 shown in FIG. 2. The purpose of the wrench is to exert a torque on a lug nut at point 26 around the short arm axis 28 by pressing the end point 30 of the long arm or handle 32 with a leverage indicated by length 34. However, due to the distance of the handle 32 away from the point 26 along the axis 28 shown by the length of the short arm at point 36, a user also applies an unwanted torque around the axis 38 by pressing the point 30 of the wrench handle 32. This necessitates a counter balance action and is not only difficult to perform but also reduces the efficiency of the wrench action. The length, 34, of the handle of such a prior art wrench is also usually found to be to short to be effective. The present invention overcomes these problems by providing an adjustable support stand for use near the point of the elbow 25.

Figure 4:
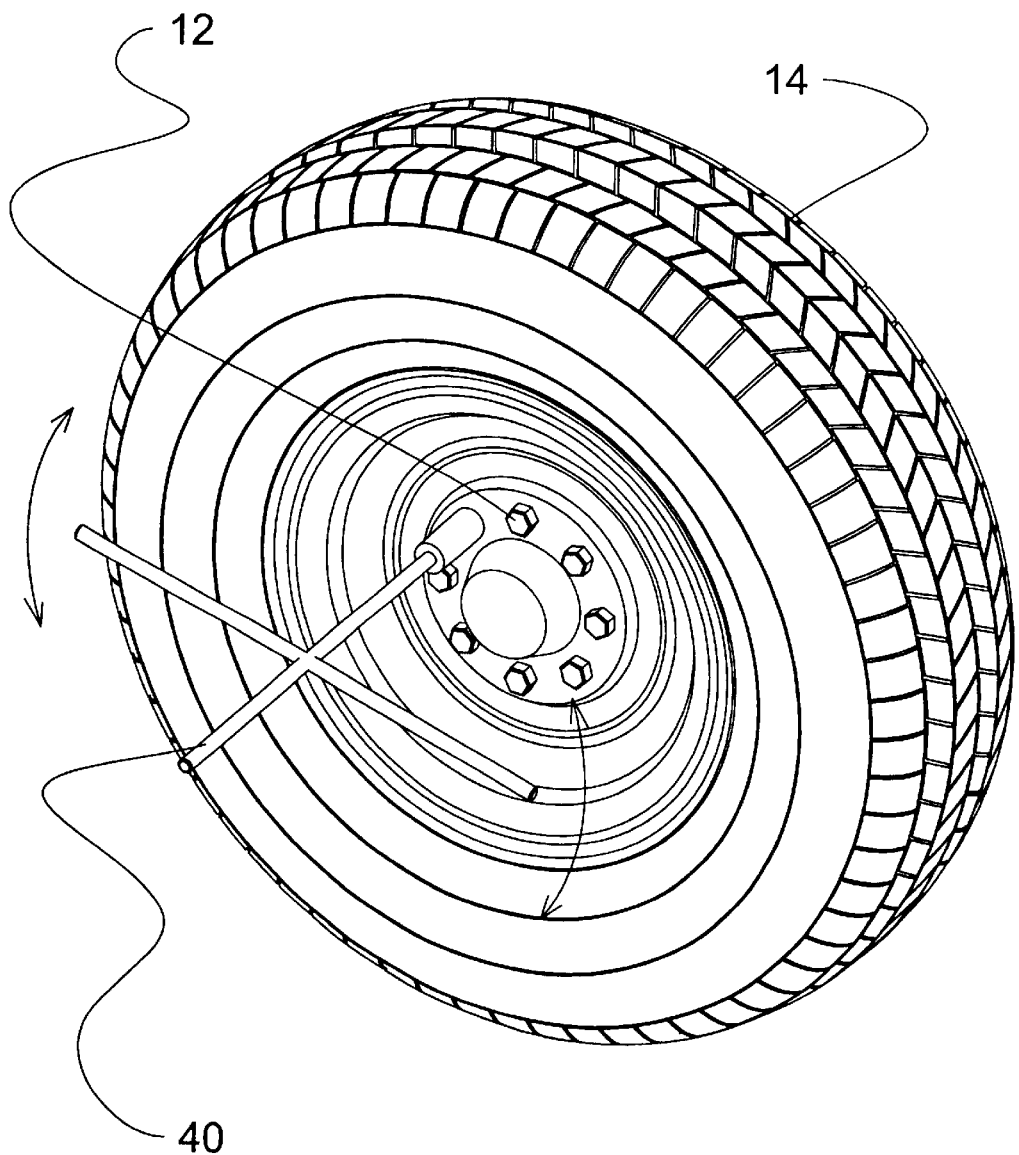
FIG. 4 is a view of another prior art wrench in use.

Turning to FIG. 4, shown therein is a view of another prior art wrench 40 in use. This wrench 40 is easier to use than the prior art wrench shown in FIGS. 2 and 3 as both arms can be employed to turn the wrench on a lug nut 12. The action is, however, limited to the force that the arm muscles can apply and, also, the force being applied is still in an unsupported position spaced away from the tire 14.

Figure 5:
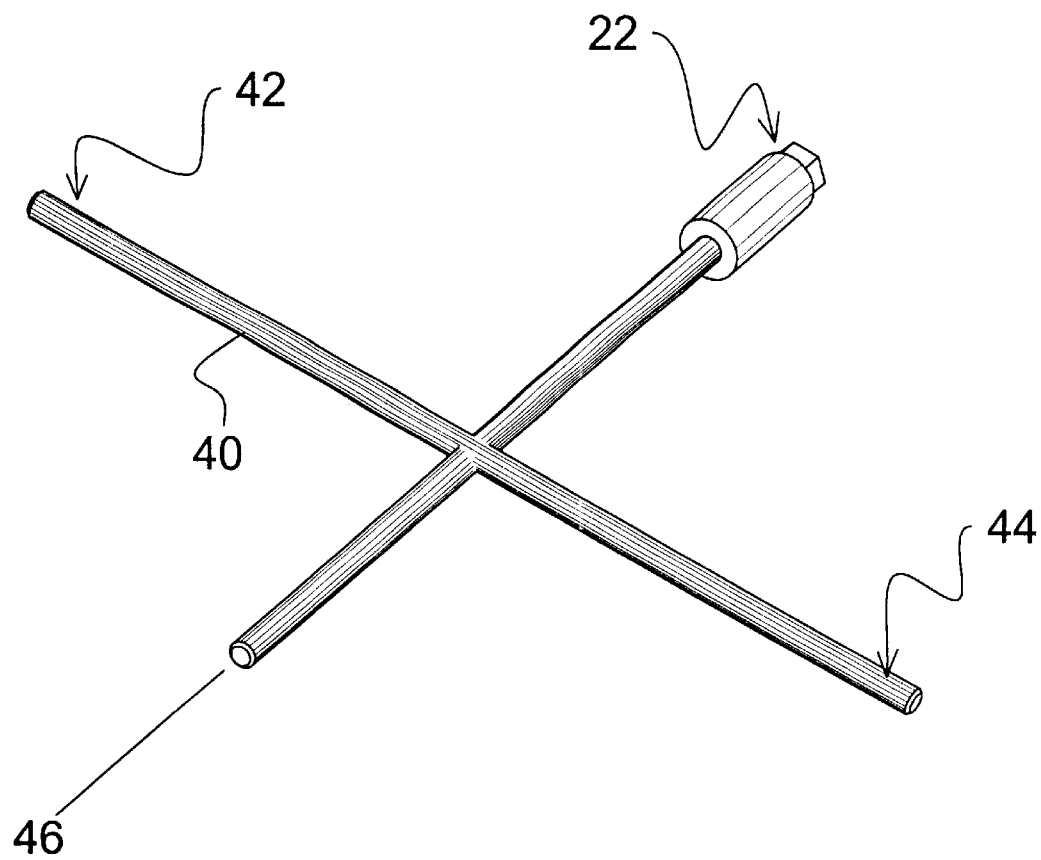
FIG. 5 is a diagram showing the torque acting on the wrench shown in FIG. 4.

Turning to FIG. 5, shown therein is a diagram showing the torque acting on the wrench 40 shown in FIG. 4. This improved wrench 40 eliminates the unwanted torque generated by the wrench shown in FIGS. 2 and 3. The torque on the lug nuts are applied by lifting up and pressing down on the arm end points 42 and 44. However, the total torque applied to the lug nut is limited by the distance of the arm muscles of a user from the center of the applied force. Also shown are a socket 22 and axis line 46.

Figure 6:
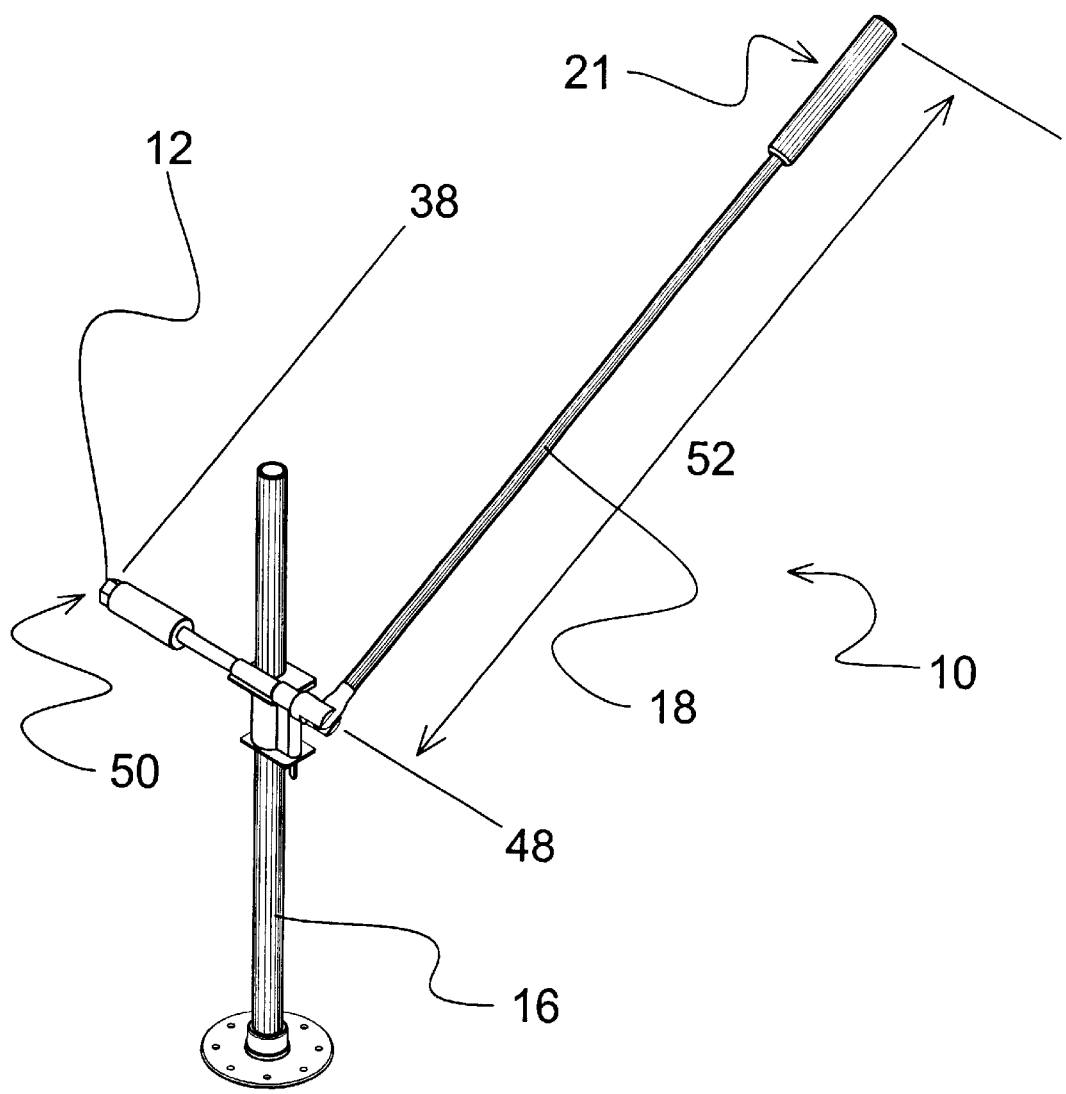
FIG. 6 is a diagram showing the torque applying action on the current invention.

Turning to FIG. 6, shown therein is a diagram showing the torque applying action on the present invention 10. The present invention 10 improves the application of the torque around the axis 48 in two major ways: first, it eliminates the unwanted torque shown at axis 38 as discussed in FIG. 3 by providing a supporting member in the form of the adjustable stand 16. This enables the use of two hands on handle 21 thereby maximizing the torque applied on the nut at point 50. The force applied is not limited to that provided by arm muscles of the user as the user can also lean his body weight on the handle 21. Secondly, the invention affords us a longer handle thereby resulting in a larger leverage shown by length of arm 52. This is made possible by the present inventions ability to be disassembled into parts, which makes it easy to be stored even if the wrench arm 18 is long. Once assembled, the wrench needs not be in one solid form as the adjustable stand 16 provides stability to the wrench. Lack of such a support rendered by the stand 16 is the reason that the prior art is made into a solid part and had to be limited in size for the storage consideration. Also shown are the lug nut 12 and arm 18.

Figure 7:
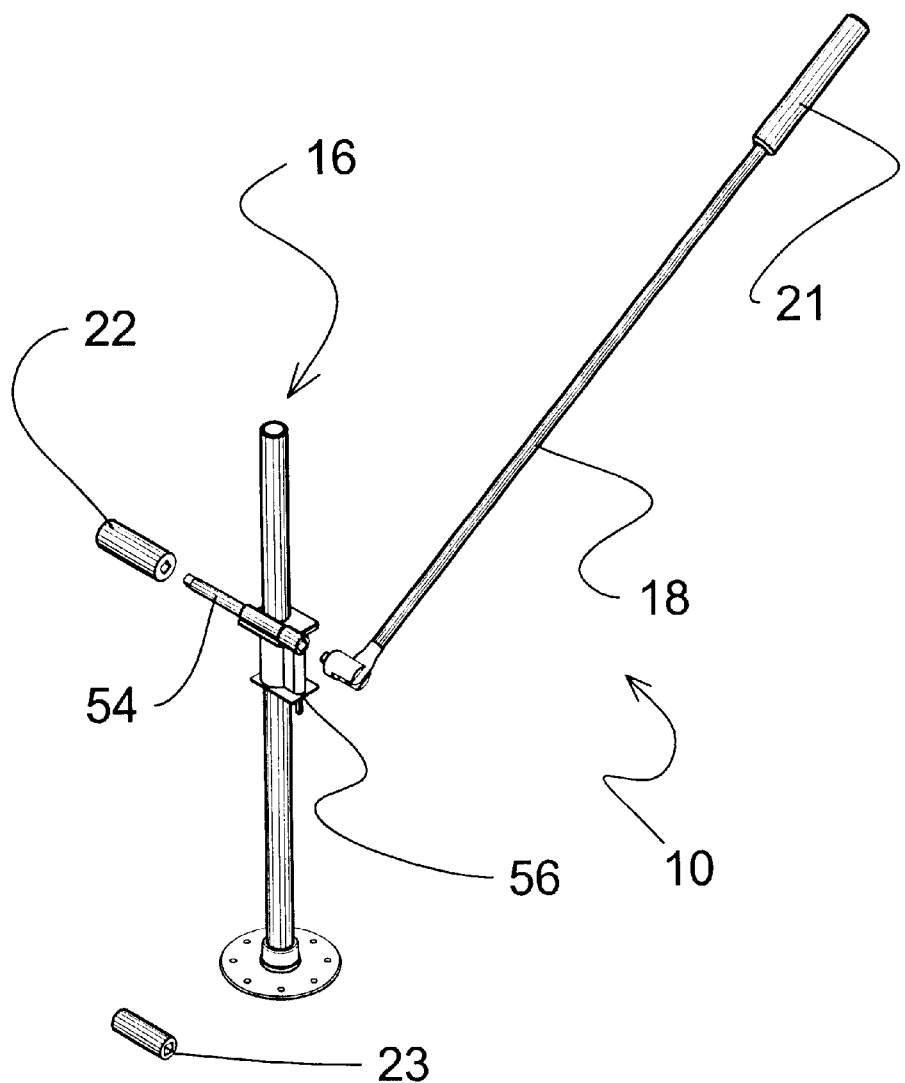
FIG. 7 is an exploded view of the current invention.

Turning to FIG. 7, shown therein is an exploded view of the present invention 10. The extension 54 for the sockets 22 are inserted into the adjustable clamp 56 and provides a pivoting point for the wrench arm 18. Various additional sockets 23 can be interchangeably used for lug nuts of different sizes, making the present invention 10 a versatile tool. Also shown are the wrench handle 21 and stand 16.

Figure 8:
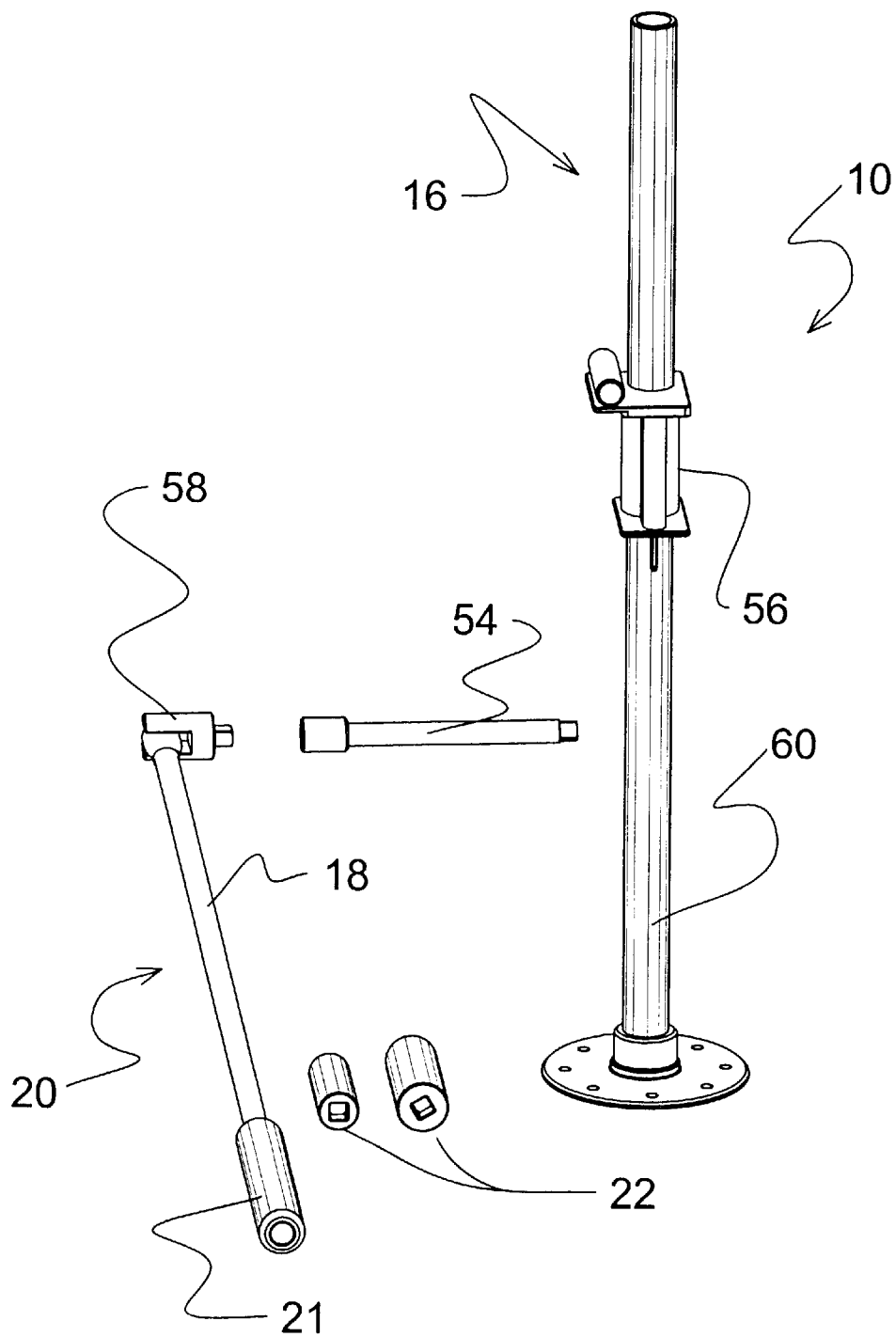
FIG. 8 is a view showing various parts of the current invention.

Turning to FIG. 8, shown therein is a view showing various parts of the present invention 10. The extension arm 54 fits onto the partially or 180-degree rotatable head 58 of the wrench 20 and accepts various sizes of the sockets 22. The role of the extension 54 is important as it provides the pivoting point of the turning action of the wrench 20. The clamp 56 can be moved along the rod or pipe 60 of the stand 16 so that the extension can be set right on top of a lug nut to be turned. Also shown are the wrench arm 18 and handle 21.

Figure 9:
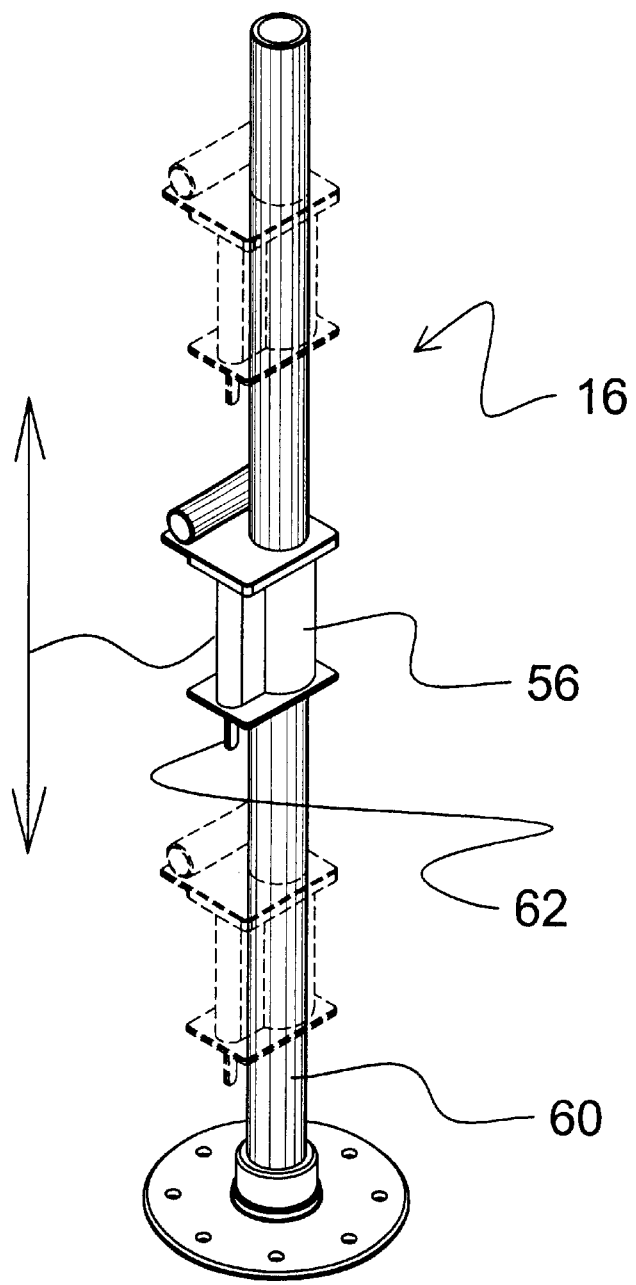
FIG. 9 is a view of the adjustable stand with a clamp relocatable along the pipe.

Turning to FIG. 9, shown therein is a view of the adjustable stand 16 with a clamp 56 relocatable in various positions along the rod 60 within a predetermined range with speed and ease. The clamp 56 is a regular pipe clamp which is held in place frictionally. Also shown is a clamp release lever 62.

Figure 10:
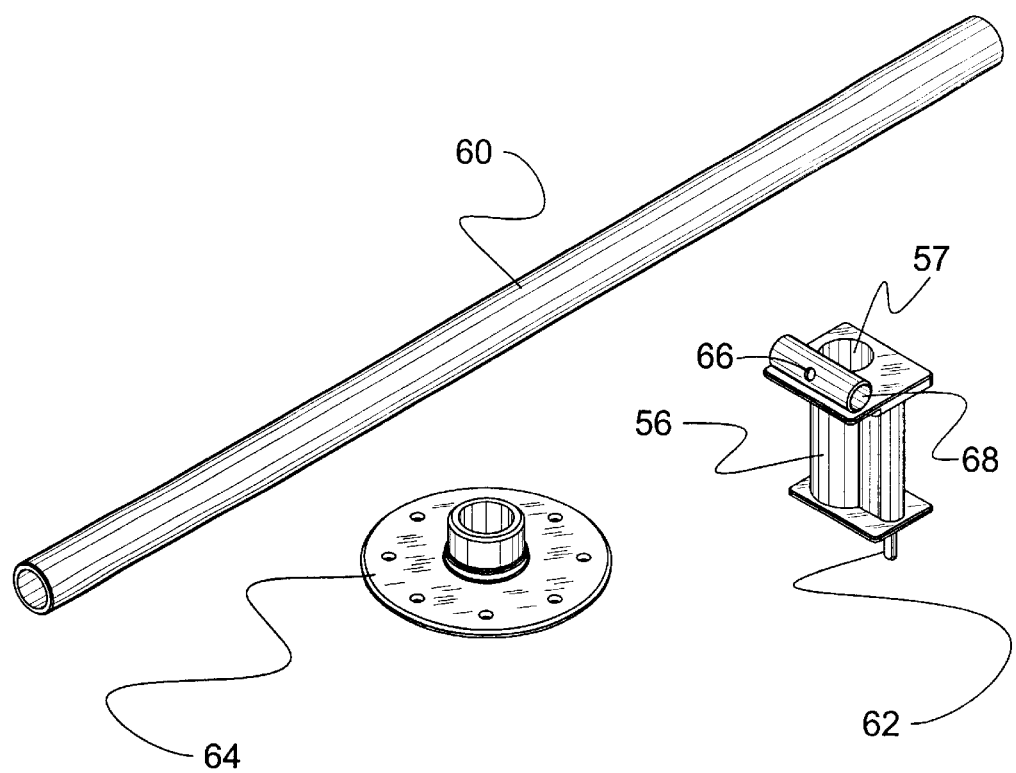
FIG. 10 is a view of the adjustable clamp parts.

Turning to FIG. 10, shown therein is a view of the adjustable clamp parts. The adjustable stand for the present invention comprises a regular pipe 60, pipe clamp 56, and the base 64. The pipe can be used with any base and secured thereto with a fastener. Also shown are a release lever 62 and an oil hole 66. The clamp 56 has an aperture 57 therein sized to receive the rod 60 therein. The connector being a sleeve 68 is also shown through which the extension arm is inserted.

Figure 11:
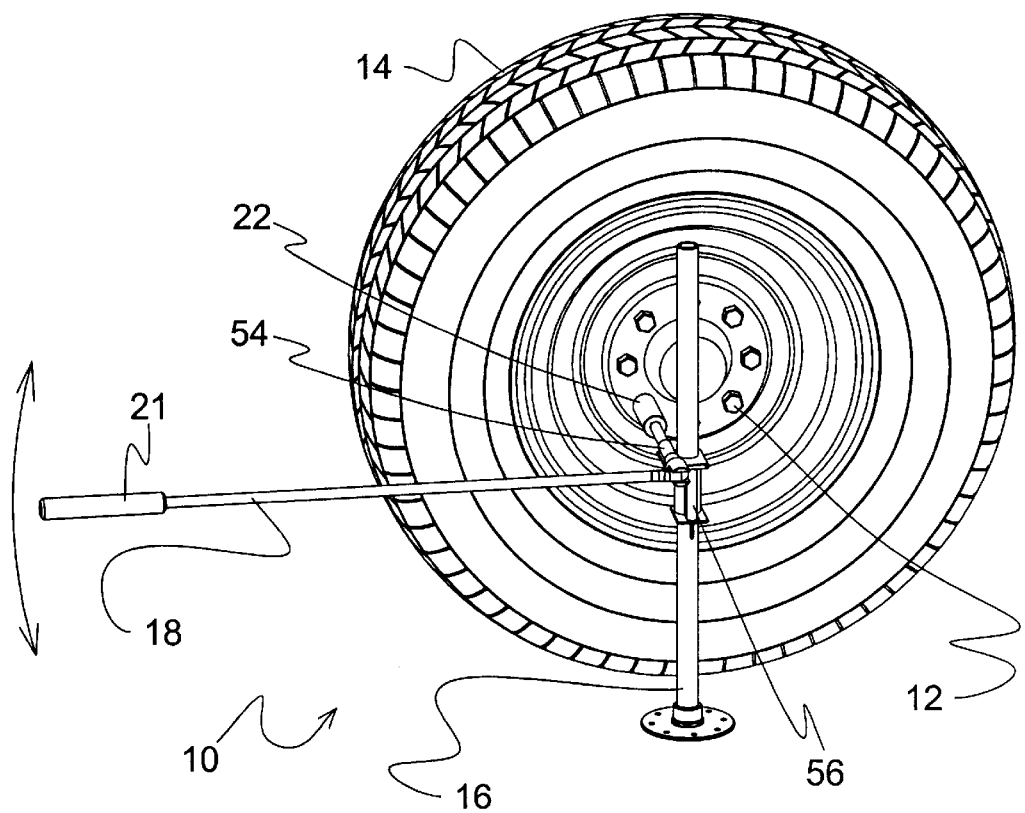
FIG. 11 is a view of the present invention on a lug nut in a different location showing a readjusted position of the clamp on the stand.

Turning to FIG. 11, shown therein is a view of the present invention 10 on a lug nut 12 in a different location showing the readjusted position of the clamp 56 on the stand 16. This figure shows how the position of the clamp 56 on the adjustable stand 16 can be relocated so that the socket 22 and the extension 54 of the present invention can be on the same axis of rotation as the lug nut 12 on the tire rim 14. In this figure the lug nut 12 is in the process of being loosened. Also shown are the wrench arm 18 and handle 21.

What is claimed to be new and desired to be protected by Letters Patent is set forth in the appended claims:

1. An apparatus for a universal lug wrench for use with the lug nuts of a vehicle tire, consisting of:

an elongated wrench arm, said wrench arm having a first end and a second end;

b) a handle disposed on said second end of said wrench arm to permit a user to grasp thereto;

c) a head disposed on a first end of said wrench to permit a socket or an extension to be 180-degrees rotatably attached thereto;

d) an extension arm being connected to said head, said extension having a first end and a second end, said first end being connected to said head;

e) a lug nut socket being disposed on said second end of said extension arm to permit connection to the lug nuts of a vehicle tire;

f) an elongated adjustable height stand comprising a vertically extending pipe having a lower end terminating in a flat base adapted to rest on the ground to support said pipe;

g) a slidable clamp mounted on said pipe for slidable movement along said pipe, said clamp having upper and lower shelf-like members;

h) a horizontally extending cylindrical sleeve mounted on the upper horizontal shelf-like member, said sleeve open at both ends through which said extension arm extends, said sleeve fully enclosing said extension arm from one end of said sleeve to another and having an oil hole the second end of said extension arm with said lug nut socket thereon adapted to engage a lug nut on a wheel and the first end of said extension arm located on a side of said pipe opposite to that of said second end; and i) a pin-like release on said clamp extending down and parallel said pipe from under said lower shelf-like member to permit said clamp to be locked into a selected position along said pipe and released to permit the clamp to be moved to another position on said pipe.

2. The apparatus of claim 1, wherein said head of said wrench arm rotates 180 degrees to permit usage frown the right or left side of the apparatus.

3. The apparatus of claim 2, wherein said lug nut sockets are of various sizes to permit use with various types of vehicles.

4. The apparatus of claim 3, wherein said sleeve has a hole therein, said hole for receiving oil.

* * * * *